Aug. 30, 1966 R. M. FELSENTHAL 3,268,973
APPARATUS FOR PRODUCING EXPANDED METAL
Original Filed April 24, 1962 2 Sheets-Sheet 1

INVENTOR:
ROBERT M. FELSENTHAL
BY

ATTORNEY

Aug. 30, 1966  R. M. FELSENTHAL  3,268,973
APPARATUS FOR PRODUCING EXPANDED METAL
Original Filed April 24, 1962  2 Sheets-Sheet 2
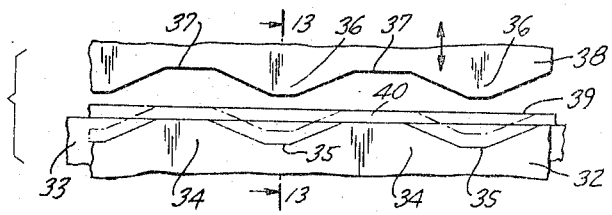
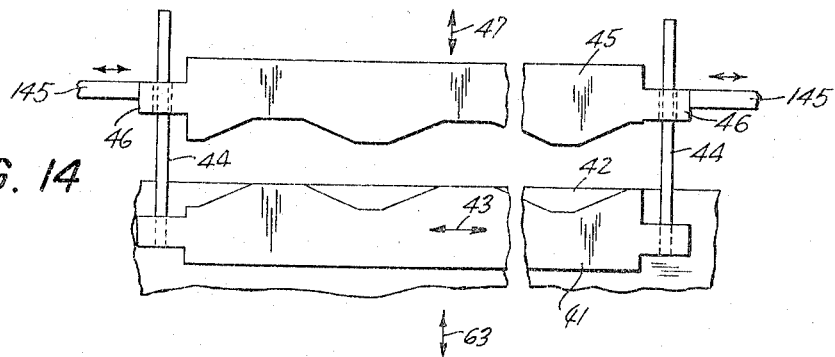
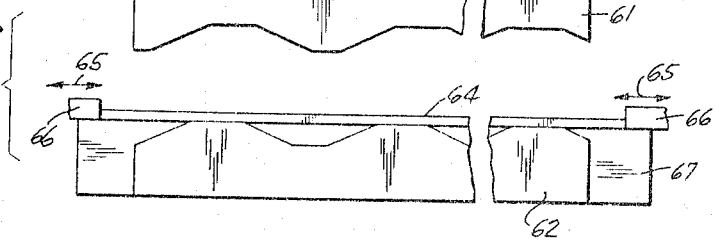
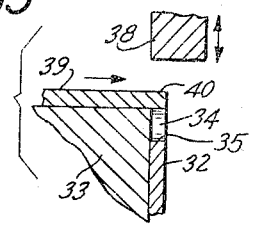
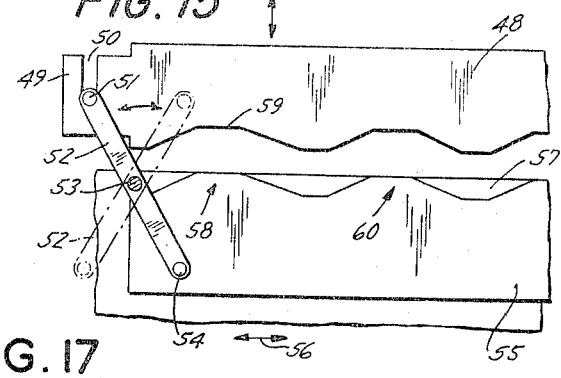
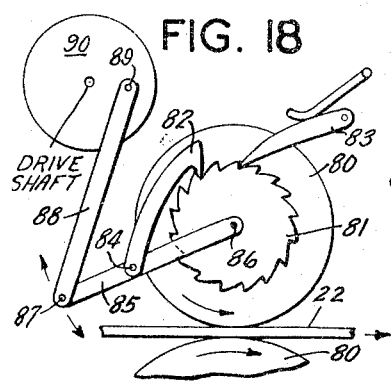
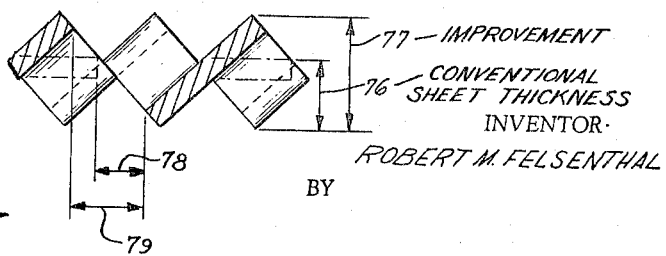
INVENTOR·
ROBERT M. FELSENTHAL
BY
ATTORNEY United States Patent Office 3,268,973
Patented August 30, 1966

3,268,973
APPARATUS FOR PRODUCING EXPANDED
METAL
Robert M. Felsenthal, Westport, Conn., assignor to Exmet Corporation, Bridgeport, Conn., a corporation of Delaware
Original application Apr. 24, 1962, Ser. No. 189,839, now Patent No. 3,162,925, dated Dec. 29, 1964. Divided and this application Nov. 16, 1964, Ser. No. 411,412
1 Claim. (Cl. 29—6.2)

This invention relates generally to metallic sheet material commonly known as "expanded metal," in which successive staggered rows of pendant sheared strands are linked together by connecting bridges, and has particular reference to improved apparatus for making such material. Coordinately, the invention relates to the improved products thereby created.

This application is a division of my copending application, Serial No. 189,839, filed April 24, 1962 (now Patent No. 3,162,925 issued December 29, 1964).

It is a general object of the invention to remedy one of the shortcomings of the commonly employed manufacturing procedure in which a shear plate and a serrated punch are reciprocated in shearing relation to each other and laterally shifted between shearing operations, while the sheet to be treated is advanced stepwise to subject successive areas to the shearing action of the punch. An almost inevitable result of this method of procedure is the creation of expanded metal in which the connecting bridges between the strands are of angled character. This is especially manifest in cases involving relatively ductile metals or in which the strands are relatively wide in comparison to the thickness of the original sheet. The angling referred to is in the lengthwise direction of the sheet and resides in the disposition of the forward half of each connecting bridge in a plane at an angle to the rearward half. This structural condition has certain disadvantages, and it is a specific object of this invention to overcome this. A further object is to attain the added advantages of an expanded metal in which the connecting bridges are relatively straight and lie in substantially single planes.

It is a well-known characteristic of expanded metal, manufactured as described, that the connecting bridges lie at an oblique angle to the plane of the finished product. By avoiding the buckling or angling mentioned above, and by causing each bridge to remain in a substantially single plane, improved characteristics can be imparted to the product, depending upon the use for which it is intended. For example, the product can be caused to have greater overall thickness, increased stiffness, or greater crushing resistance. Also, the free flow of fluids through the mesh can be enhanced. These are illustrative of the benefits resulting from the present invention.

Some of these advantages have been sought to be achieved, heretofore, by special stretching or distortion of the mesh longitudinally, after its initial formation, and by procedures combing slitting and stretching in closely related sequences. The present invention achieves the desired objects without necessitating any additional stretching operations. Moreover, it is applicable to metals and alloys of specialized character, and useful in mesh sizes and shapes for which apparatus and procedures heretofore employed have been unsuitable.

It is a further object of the invention to achieve all these desirable results by apparatus of relatively simple character, thoroughly practical and inexpensive from a manufacturing standpoint, and reliable and effective in use.

Several ways of achieving these objectives, and such other object and advantages as may hereinafter be pointed out, are shown by way of example in the accompanying drawings, in which:

FIG. 12 is a view similar to FIG. 1, showing one form of the improved apparatus;

FIG. 13 is a cross-sectional view substantially along the line 13—13 of FIG. 12;

FIG. 14 is a view similar to FIG. 12, showing one embodiment of the correlating mechanism;

FIG. 15 is a view similar to FIG. 12, showing a second embodiment of the correlating mechanism;

FIG. 16 is a view similar to FIG. 12, showing an alternative apparatus and procedure;

FIG. 17 is an exaggerated longitudinal cross-section of an expanded metal product resulting from this invention; and FIG. 18 is an illustrative mechanism for intermittently advancing a sheet to be treated.

FIGS. 1–10 depict known apparatus of the "guillotine" type, and show in an exaggerated manner the shortcomings which the present invention has overcome.

Figure 1:
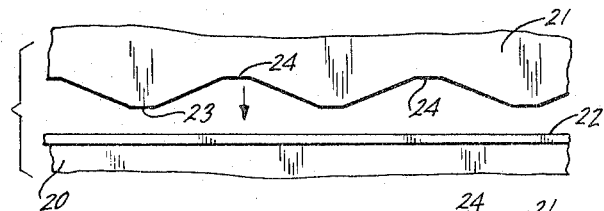
FIG. 1 is a fragmentary elevational view, of simplified diagrammatic character, of a conventional shear plate and punch at the commencement of a sequence of operations resulting in the formation of expanded metal.
Figure 5:
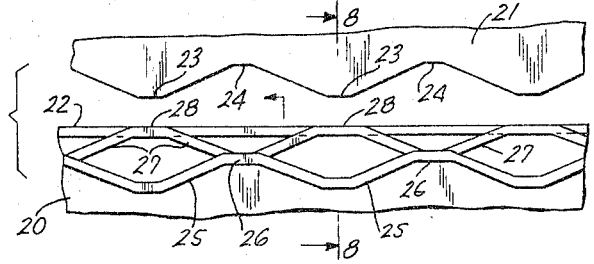

A shear blade or plate 20 and a punch 21 are arranged in shearing relationship. A sheet of metal to be treated (22) is advanced intermittently (in the direction of the observer in FIGS. 1–5) to bring successive regions into an overhanging relation to the shear plate 20 and thus subject them to the shearing action of the punch 21. (The intermittent advance of the sheet 22 may be brought about by any conventional means, e.g., by a mechanism (FIG. 18) in which one of two feed rollers 80 carries a ratchet 81 actuated by a pawl 82, reverse movement being prevented by a spring-pressed pivoted keeper 83. Pawl 82 is pivoted at 84 to an arm 85 that rocks on axis 86 and is pivoted at 87 to an actuating link 88 connected at 89 to a drive wheel 90 driven by the main shaft of the machine.) These advancements of the metal 22 occur during the periods that the punch 21 is withdrawn from the shear plate (FIGS. 1, 3, 5). During these periods there is also a relative lateral shift of punch 21 and sheet 22.

The punch 21 is serrated, i.e., it has tooth-like parts 23 with intervening recesses or depressions 24. These can be shaped or contoured in various ways to produce correspondingly different effects. The ends of the "teeth" 23 are preferably blunted, as shown.

Figure 2:
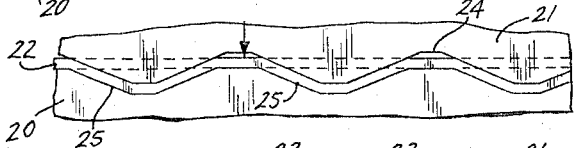
FIGS. 2–5 are similar views of successive operations.
Figure 3:
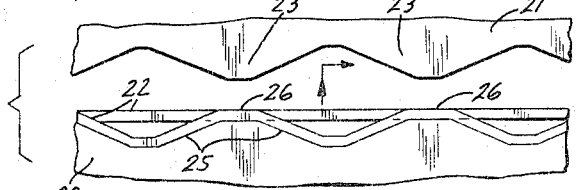
Figure 4:
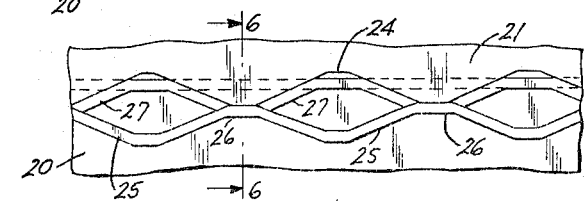
Figure 9:
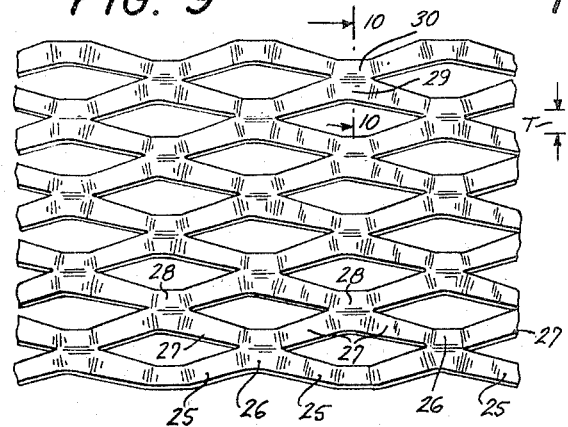
FIG. 9 is a face view of a piece of the resultant expanded metal.

Assuming in FIG. 1 that the sheet 22 is in a position in which its advancing margin overhangs the edge of the shear plate 20 by the desired amount, the punch 21 is now caused to descend to the position of maximum advance shown in FIG. 2. This shears the pendant strands 25, which nevertheless remain connected to the parent sheet in the regions 26 between the serrations 23 of the punch 21. The punch then withdraws and shifts laterally relative to sheet 22, as indicated by arrows in FIG. 3. During this period, the sheet 22 advances again to bring the next successive region into shearing position. On the next descent of the punch 21 (FIG. 4) the serrations encounter the regions 26 and shear the next row of pendant strands 27. These are similarly retained in connected relation to the parent sheet in the regions 28 between the serrations 23 of the punch. Again, the punch 21 withdraws (FIG. 5) and shifts back to the position of FIG. 1, while the sheet 22 advances again. This sequence of steps is repeated again and again, as often as may be desired. The resultant product is shown in FIG. 9, there being successive staggered rows of pendant sheared strands linked together by connecting bridges. In FIG. 9, the two rows at the bottom are numbered to correspond to the procedural steps described in connection with FIGS. 1–8.

Figure 6:
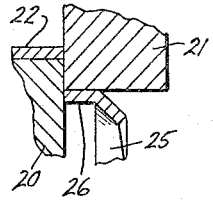
FIG. 6 is a cross-sectional view substantially along the line 6—6 of FIG. 4.
Figure 7:
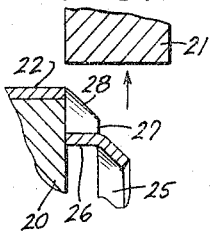
FIG. 7 is a view similar to FIG. 6 showing a subsequent step in the process.
Figure 8:
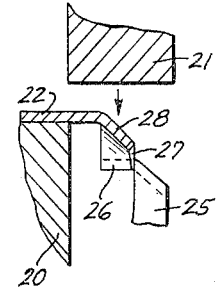
FIG. 8 is a cross-sectional view substantially along the line 8—8 of FIG. 5.
Figure 10:
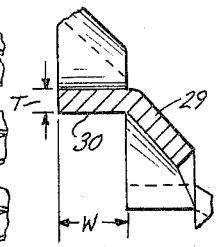
FIG. 10 is an enlarged fragmentary cross-section along the line 10—10 of FIG. 9.

One of the connecting bridges is shown on an enlarged scale in FIG. 10. It will be noted that its forward half 29 has been angled out of the plane of the rearward half 30. This is due to the pulling action of the punch 21 during each shearing operation. As indicated in FIGS. 6 and 7, the rearward part of each connecting bridge remains in a plane parallel to the original plane of the sheet 22, but during the shearing operation the forward halves of the next set of connecting bridges, which are then in positions overhanging the shear plate 20, are pulled downwardly. The successive angulations are shown in a somewhat exaggerated manner in FIGS. 6, 7, 8 and 10, for the sake of clarity.

The degree to which the bridges will distort as described depends upon numerous factors. For example, it varies with the mesh length (i.e., the "pitch" of the "teeth" on the serrated punch). It also varies with the depth to which the punch descends during the shearing procedure, with the nature and thickness of the sheet being treated, and with the ratio of strand width (W) to sheet thickness (T) as indicated in FIG. 10. Usually, if the ratio $W/T$ is greater than 2 (and often it may be as high as 5) the distortion of the connecting bridges attains appreciable magnitude.

Figure 11:
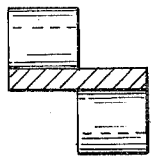
FIG. 11 is a view similar to FIG. 10, showing by comparison the nature of the improved result achieved by the present invention.

In contrast to this, the expanded metal produced by the present invention (using the same sheet material, sheet thickness, and $W/T$ ratio) has a cross-sectional configuration of the nature indicated in FIG. 11. The forward half of each bridge lies in substantially the same plane as the rearward half. This result is achieved by providing a special means for supporting the overhanging areas of the sheet, during each shearing operation, in the regions between the serrations of the punch.

In the embodiments of the invention shown in FIGS. 12–16, the support means is a comb-like element directly adjacent to the shear plate and directly beneath the overhanging sheet area, the comb being provided with serrations or teeth-like parts facing toward and in complementary alignment with those of the punch. In FIGS. 12 and 13, for example, a comb 32 of this character is secured flat against the outer face of the shear plate 33, directly adjacent to the shearing edge. The element 32 has "teeth" 34 and intervening depressions 35, corresponding in size and spacing to the teeth 36 and depressions 37 of the punch 38. The blunted ends of teeth 34 lie substantially at the level of the shearing edge of plate 33. As a result, when the punch 38 descends to the position shown in dot-and-dash lines, the sheet 39 is correspondingly sheared as hereinbefore described, but the overhanging regions 40 between the serrations 36 of the punch are supported from beneath by the serrations 34 of the comb 32. This effectively counteracts the tendency of the punch 38 to pull these regions 40 out of the plane of the sheet 39, and thus the connecting bridges of the resultant product are straight and unbent as shown in FIG. 11.

It is necessary, of course, to correlate the relative movements of the shearing parts and the sheet itself so that a supporting comb or its equivalent is always in position to exert the desired supporting function upon the connecting bridges that are being formed. There are several ways of doing this, and they are illustrated in FIGS. 14–16 inclusive.

In FIG. 14, the supporting comb 41 is mounted in laterally shiftable manner with respect to the shearing plate 42. This shiftability is indicated by the arrows 43. At its ends the comb 41 carries guide posts 44. The punch 45 is provided with ears or projections 46 having guide holes through which the posts 44 extend. In this way to punch 45 is able to reciprocate up and down (arrows 47) relative to the shear plate 42 and support comb 41, whereas both the punch 45 and the comb 41 are laterally shiftable in unison.

The means for moving the punch toward and away from the shear plate, and also laterally back and forth, and the means for intermittently advancing the sheet being treated, have not been shown in detail in any of the figures. Any known motive power or mechanisms, properly actuated in timed relation, can be employed for these purpose. Guiding means such as guide rails or the like, and other structural elements and expedients of commonly known character, have also been omitted from the drawings for the sake of simplicity.

It will be understood that the treatment of a sheet of metal by the apparatus shown in FIG. 14 will be carried out in the manner hereinbefore described. The sheet has not been illustrated, but it is advanced intermittently along the top face of the shear plate 42 to bring successive areas into an overhanging relationship and into the range of action of the shearing punch 45. During each period of withdrawal of the punch 45 the sheet to be treated is advanced, while the punch 45 (and with it the comb 41) is shifted laterally, e.g., by pushrods 145 or the like. In this way there is always a prop or support under each overhanging area lying between the serrations of the punch.

In FIG. 15, an arrangement is shown in which the punch 48 has ears 49 provided with vertical slots 50. Riding in each slot is a pivot pin 51 carried at the upper end of a connecting link 52. The link 52 is pivoted to a fixed central axis 53 mounted on a stationary part of the apparatus. At its lower end, the link 52 is pivoted as at 54 to the supporting comb 55, guided in any suitable way for lateral reciprocation as indicated by arrows 56. The slots 50 allow the punch 48 to move up and down in shearing relation to the shear plate 57, and the links 52 serve to interengage the punch 48 and the comb 55 so that the required complementary alignment is automatically established during each cycle of operation. Unlike the arrangement of FIG. 14, the punch 48 and the comb 55 move laterally in opposite directions, and the extent of movement of each is half the "pitch" of the serrations. Thus, whereas the tooth 58 of the comb 55 is shown in FIG. 15 in alignment with the recess or depression 59 of the punch 48, the recess 59 will become aligned with the tooth 60 of the comb after the parts have shifted laterally as indicated by the dot-and-dash position of the link 52. As a result, upon each descent of the punch 48 into shearing relationship to the shear plate 57, there is a prop or support under the overhanging areas of the sheet lying between the serrations of the punch. As in the case of FIG. 14, the sheet to be treated has not been shown in FIG. 15, but the mode of procedure will be readily understood from the description hereinbefore given.

FIG. 16 shows the possibility of leaving the punch 61 and the supporting comb 62 laterally fixed at all times (although the punch is movable up and down as indicated at 63), and achieving the desired objective by shifting the sheet 64 laterally back and forth as indicated by the arrows 65 and the pushers 66. Of course the entire shear plate 67 might be caused to participate in this lateral reciprocation, if desired, provided that relative movement of the shear plate 67 with respect to the fixed comb 62 is provided for.

In FIG. 17 some of the advantages of the improved expanded metal are illustrated diagrammatically. The overall thickness of the improved product is indicated at 77. In contrast to this, because of the angling of each of the connecting bridges, as indicated in dot-and-dash lines, the overall thickness of the conventional expanded metal product, formed of the same original sheet, would be as indicated at 76. Coupled with this increased overall thickness is added rigidity, greater strength, and wider passages through the mesh. Wider passages allow flow or accommodation of more fluid, paste, or fine powder than would be afforded by narrower passages.

It will be understood that many of the details herein described and illustrated may be modified by those skilled in the art without necessarily departing from the spirit and scope of the invention as expressed in the appended claims.

What is claimed is:

In apparatus for producing an expanded metal sheet in which successive staggered rows of pendant sheared-out strands are linked together by connecting bridges:

(a) a shear plate and a serrated punch reciprocable in shearing relation to each other, (b) means for causing stepwise advancement of the sheet to be treated, to bring successive areas into overhanging relation to the shear plate and thus subject them to the shearing action of said punch, (c) means for effecting a relative back-and-forth lateral shift of punch and sheet between shearing operations, said means comprising means for imparting lateral back-and-forth movements to the sheet while the punch remains laterally stationary, and (d) means for supporting the overhanging area of the sheet during each shearing operation in the regions between the serrations of the punch so as to counteract the tendency of the punch to pull the connecting bridges out of the plane of the sheet, said means comprising a laterally stationary comb directly adjacent to and in contact with the shear plate and directly beneath the overhanging sheet area, said comb having serrations facing toward and in complementary alignment with those of the punch, the peak of each comb serration lying substantially at the level of the shearing edge of said plate.

No references cited.

RICHARD H. EANES, JR., *Primary Examiner.*